United States Patent Office 3,421,883
Patented Jan. 14, 1969

3,421,883
PESTICIDAL PREPARATION AND
METHOD OF USE
Otto Rohr, Neu-Allschwil, Switzerland, assignor to Ciba
Limited, Basel, Switzerland, a Swiss company
No Drawing. Original application Jan. 23, 1964, Ser. No.
339,818, now Patent No. 3,329,702, dated July 4, 1967.
Divided and this application Mar. 20, 1967, Ser. No.
635,286
Claims priority, application Switzerland, Jan. 29, 1963,
1,086/63
U.S. Cl. 71—105      4 Claims
Int. Cl. A61k *13/00;* A01n *9/22*

ABSTRACT OF THE DISCLOSURE

A pesticidal preparation, more especially an insecticidal, herbicidal and microbicidal preparation, which comprises as active substance a compound of the general formula

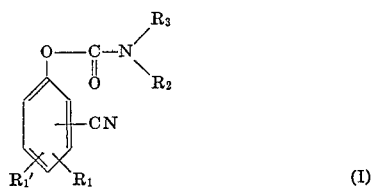

wherein $R_1$ and $R_1'$ are identical or different and each represents a hydrogen atom, a halogen atom, preferably a chlorine atom, an alkoxy radical containing 1 to 4 carbon atoms or the group —$NO_2$, $R_2$ represents a hydrogen atom or an alkyl radical containing 1 to 4 carbon atoms, and $R_3$ represents an alkyl radical containing 1 to 4 carbon atoms—and, if desired, one or more of the following additives: a solvent, a diluent, a dispersing agent, a wetting agent, an adhesive and other pesticides.

---

This application is a division of application Ser. No. 339,818, Filed Jan. 23, 1964, now U.S. Patent 3,329,702.

The present invention provides a pesticidal preparation, more especially an insecticidal, herbicidal and microbicidal preparation, which comprises as active substance a compound of the general formula

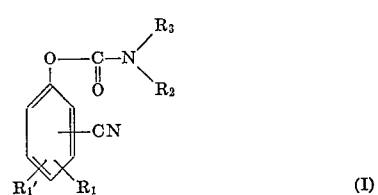

wherein $R_1$ and $R_1'$ are identical or different and each represents a hydrogen atom, a halogen atom, preferably a chlorine atom, an alkoxy radical containing 1 to 4 carbon atoms or the group —$NO_2$, $R_2$ represents a hydrogen atom or an alkyl radical containing 1 to 4 carbon atoms, and $R_3$ represents an alkyl radical containing 1 to 4 carbon atoms—and, if desired, one or more of the following additives: a solvent, a diluent, a dispersing agent, a wetting agent, an adhesive and other pesticides. Especially good results have been obtained when using preparations that contain as active substance, a compound of the general formula

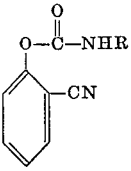

wherein R represents a methyl or ethyl radical.

The new preparations are especially suitable for combating harmful insects, for example, excellent results have been obtained against flies, for example, *Musca domestica* and midges and midge larvae, especially *Aedes aegyptii.* In this application, the new preparations act as stomach and contact poisons. The preparations of the invention are also suitable for use as total or selective weed killers, as defoliating preparations, for example in cotton cultures, also for combating harmful micro-organisms, above all phytopathogenic bacteria and fungi.

The compounds of the general Formula I, and especially those of the general Formula II, are distinguished by their surprisingly low toxicity towards warm-blooded beings.

The compound of the formula

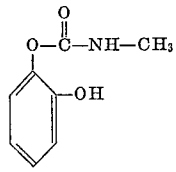

is especially effective against harmful insects and has an especially low toxicity towards warm-blooded beings.

The new compounds of the general Formula I can be manufactured by known methods, for example by reacting a compound of the general formula

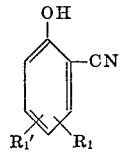

wherein $R_1$ and $R_1'$ have the same meanings as in the general Formula I, with an alkylisocyanate, in the presence of an inert organic solvent, for example ether.

As mentioned above, the new preparations may contain various additives in addition to a new active substance of the general Formula I or II. Accordingly, the new active substances have various ways of application which are described in detail below.

The spray solutions for immediate use contain, for example, petroleum fractions having medium to high boiling point, more especially those boiling above 100° C. for example diesel oil or kerosene, also coal tar oil or oils of vegetable or animal origin, also hydrocarbons for example alkylated naphthalenes, tetraphydronaphtahlene, xylene mixtures, cyclohexanols and, if desired, also ketones, chlorinated hydrocarbons, for example tetrachloroethane, trichloroethylene or trichlorobenzenes and tetrachlorobenzenes.

In preparing aqueous preparations of the compounds of the invention use is made of emulsion concentrates, pastes or wettable spray powders, with addition of water. As suitable emulsifiers or dispersants there may be mentioned, non-ionic products, for example condensation products of aliphatic alcohols, amines or carboxylic acids having a long-chain hydrocarbon radical of about 10 to 30 carbon atoms with ethylene oxide, for example the condensation product of octadecyl alcohol with 25 to 30 mols of ethylene oxide, or of soyabean fatty acids with 30 mols of ethylene oxide, or of commercial oleylamine with 15 mols of ethylene oxide, or of dodecylmercaptan with 12 mols of ethylene oxide. There may also be used condensation products of ethylene oxide with hydroaromatic polycyclic carboxylic acids or amines. Among the suitable anionic emulsifiers there may be mentioned: the sodium salt of dodecyl alcohol sulphuric acid ester, the sodium salt of dodecyl benzenesulphonic acid, the potassium or triethanolamine salt of oleic acid or of abietic acid or of mixtures of these two acids, or the sodium salt of a petroleum-sulphonic acid. Suitable cationic dispersants are quaternary ammonium and phosphonium compounds, for example cetyl pyridinium chloride or dihydroxyethylbenzyl dodecyl ammonium chloride.

When the new preparations are to be used as dusting or casting agents they may contain, as solid vehicles, talcum, kaolin, bentonite, sand, calcium carbonate, calcium phosphate, or coal, cork meal and wood meal and other materials of vegetable origin. The various preparations may incorporate the usual additives capable of improving the distribution, adhesion or penetration. As such substances, there may be mentioned fatty acids, resins, adhesives, casein or, for example, alginates. It is also very advantageous to use the preparations in granular form. The new compounds may be the only active substances present in the pesticides, or there may be other insecticides, acaricides, nematocides, molluscicides, herbicides or fungicides also present. These preparations are employed in plant protection and in hygiene by the usual spraying, pouring, dusting and fumigating methods.

The present invention further includes the compounds of the above general Formulae I and II as such, as well as their manufacture by known methods.

The following examples illustrate the invention, the parts and percentages being by weight.

EXAMPLE 1

(a) 23.8 parts of 2-cyanophenol and 0.1 part of triethylenediamine were dissolved in 50 parts by volume of ether. A solution of 12.5 parts of methylisocyanate in 10 parts by volume of ether was then dropped in at a temperature within the range of 10° C. to 20° C., and the whole was stirred for 30 minutes at 35° C. The precipitated reaction product was filtered off and recrystallized from a mixture of acetone and benzine, to yield the compound of the formula

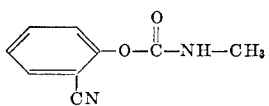

melting at 114° to 116° C.

(b) 17.9 parts of 2-cyanophenol were reacted with 9.5 parts of methylisocyanate as described under (a) above and the reaction product was recrystallized from a mixture of acetone and benzine, to yield 22 parts of the compound of the formula

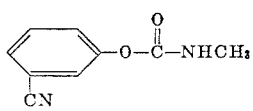

melting at 115° to 117° C.

(c) 23.8 parts of 2-cyanophenol were reacted with 15.6 parts of ethylisocyanate as described under (a) above, and the reaction product was recrystallized from a mixture of benzene and petroleum ether, to yield 29.5 parts of the compound of the formula

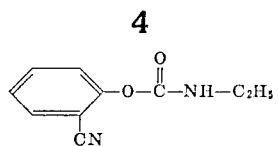

melting at 64° to 65° C.

(d) A mixture of 23.8 parts of 2-cyanophenol, 21.5 parts of dimethyl carbamyl chloride and 19 parts of anhydrous pyridine was heated for 2 hours at 150° C. bath temperature. The cooled reaction product was then extracted with ether, the ethereal solution was washed successively with water, 2 N sodium hydroxide solution, 2 N hydrochloric acid and once more with water, dried over sodium sulphate, and the solvent was distilled off. The residue was distilled under high vacuum and yielded a compound of the formula

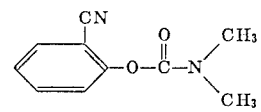

which boiled at 90° C. under 0.01 mm. Hg pressure. Melting point: 42° to 44° C.

In a manner analogous to that described above under (a) to (d), the following compounds can be prepared:

(e)

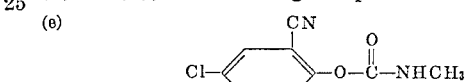

M.P.: 108°–110° C.

(f)

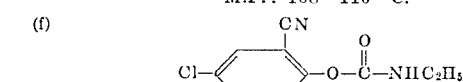

M.P.: 100°–103° C.

(g)

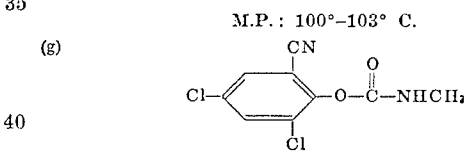

M.P.: 135°–139° C.

(h)

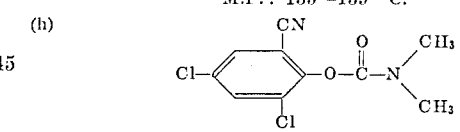

M.P.: 81°–83° C.

(i)

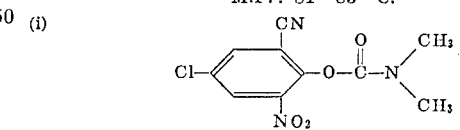

M.P.: 101°–102° C.

(k)

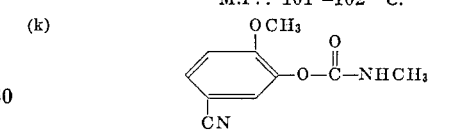

M.P.: 114°–116° C.

(l)

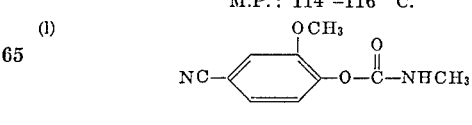

M.P.: 144°–146° C.

(m)

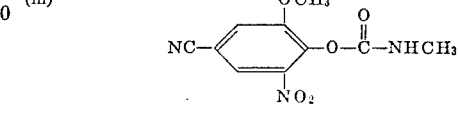

M.P.: 163°–165° C.

EXAMPLE 2

A spray powder of the following composition was manufactured:

50% of one of the active substances listed in Example 1 under (a) to (m),
25% of bolus alba (kaolin),
20% of finely divided silica (product marketed under the trademark "Hisil"),
3.5% of a condensation product from 1 mol of dodecylmercaptan and 12 mols of ethylene oxide,
1.5% of a condensation product of para-nonylphenol and 9 mols of ethylene oxide.

The resulting, finely ground mixture could be diluted with water in any desired proportion, to form a spray broth ready for use.

EXAMPLE 3

(a) The compound of the formula

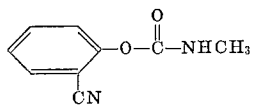

was tested for its effect as a contact poison on the house fly (*Musca domestica*), the tests being carried out in the following manner:

Two solutions of the above compound in acetone were prepared, one of 0.001% strength and the other of 0.0005% strength, 1 cc. of each acetone solution was introduced into the bottom and top halves of Petri dishes having a diameter of about 10 cm. and the solvent was then allowed to evaporate. 10 flies were then placed in each dish, the dishes were closed, and after a lapse of two hours the number of flies that could not walk and were in a recumbent position was counted. These tests were repeated six times.

The effect of the above compound on *Musca domestica* was, at a concentration of 0.001% complete (100%), and at a concentration of 0.0005% it was of the order of 93%.

A similar effect was achieved with the compound described in Example 1(d).

Good insecticidal effects were also achieved with the compounds described in Example 1 under (c) and (e) to (i).

(b) The following kinds of plants were planted in pots: *Hordeum sativum, Beta vulgaris, Calendula chrysantha, Linum usitatissimum, Medicago sativa, Brassica rapa, Daucus carota* and *Spinacea oleracea*. The treatment was carried out 12 days after seeding, when the first pair of foliage leaves had developed. The plants were treated with a spray broth, prepared as described in Example 2, containing as active substance 2-cyano-4-chlorophenyl-N-ethylcarbamate. The amount applied corresponded to 10 kg. of active substance per hectare. It was found that 20 days after the treatment, the plants mentioned had died off completely or had been substantially completely destroyed so that they could not recover.

A similar effect was obtained with the compounds described in Example 1 under (e) and (g) to (m).

(c) Celery plants were treated with a spray broth, prepared as described in Example 2, containing 0.2% of the active substance of the formula

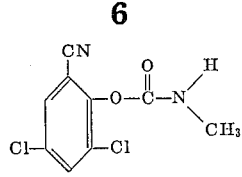

described in Example 1 under (g).

2 days after the treatment, the celery plants were infected with a spore suspension of *Septoria apii*, and the plants were then kept for 2 days in an incubation chamber at a relative atmospheric humidity of 95 to 100% at 22 to 26° C. On evaluation, it was found that the effect attained against *Septoria apii*, was 100%.

What is claimed is:

1. A preparation for combating pests comprising a pesticidal amount of a compound of the formula

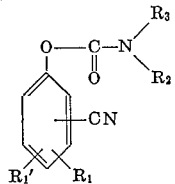

wherein $R_1$ and $R_1'$ each represents a member selected from the group consisting of a hydrogen atom, a chlorine atom, a lower alkoxy radical and the group —$NO_2$, $R_2$ represents a member selected from the group consisting of a hydrogen atom and a lower alkyl radical and $R_3$ represents a lower alkyl radical and in addition thereto a carrier.

2. The method for combating pests which comprises applying to the area in which the said effect is desired a pesticidal amount of a compound of the formula

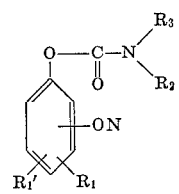

wherein $R_1$ and $R_1'$ each represents a member selected from the group consisting of a hydrogen atom, a chlorine atom, a lower alkoxy radical and the group —$NO_2$, $R_2$ represents a member selected from the group consisting of a hydrogen atom and a lower alkyl radical and $R_3$ represents a lower alkyl radical.

3. The method for combating harmful insects which comprises applying to the area in which the said effect is desired an insecticidal amount of a compound of the formula set forth in claim 2.

4. The method for combating harmful microbes which comprises applying to the area in which the said effect is desired a microbicidal amount of a compound of the formula set forth in claim 2.

References Cited

UNITED STATES PATENTS

| | | | |
|---|---|---|---|
| 2,933,383 | 4/1960 | Lambrech | 71—106 |
| 3,140,167 | 7/1964 | Haubein | 71—106 |

FOREIGN PATENTS 902,586  8/1962  Great Britain.

JAMES O. THOMAS, JR., *Primary Examiner.*

U.S. Cl. X.R.

424—300

UNITED STATES PATENT OFFICE
CERTIFICATE OF CORRECTION

Patent No. 3,421,883                      January 14, 1969

Otto Rohr

It is certified that error appears in the above identified patent and that said Letters Patent are hereby corrected as shown below:

Column 6, lines 35 to 43, the formula should appear as shown below:

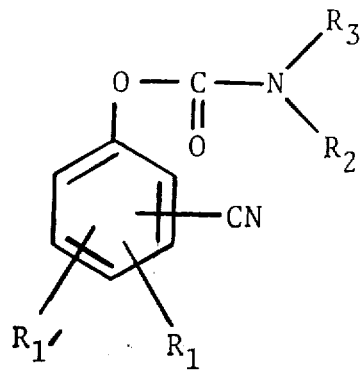

Signed and sealed this 24th day of March 1970.

(SEAL)
Attest:

EDWARD M. FLETCHER, JR.              WILLIAM E. SCHUYLER, JR.
Attesting Officer                       Commissioner of Patents